July 7, 1936.  W. J. WIXSON  2,046,668
LIQUID INDICATOR
Filed March 30, 1935
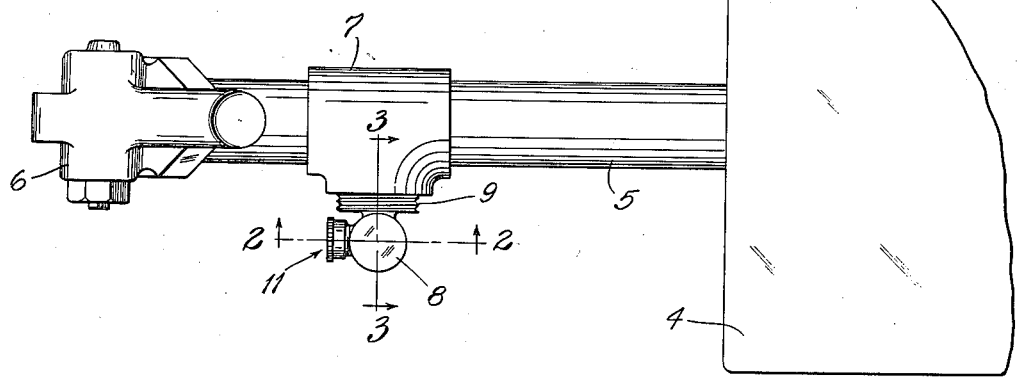
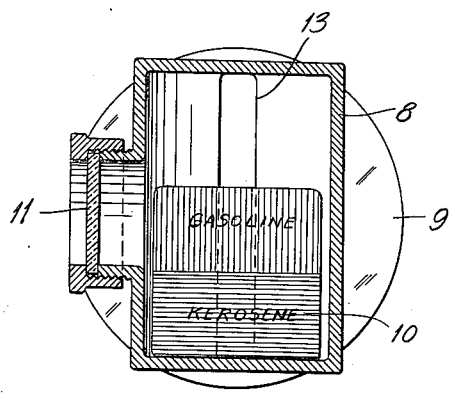
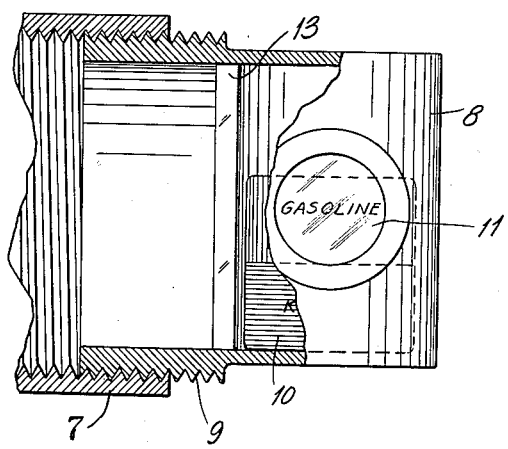
INVENTOR:
W. J. WIXSON
By Albert J McCauley
ATTORNEY.

Patented July 7, 1936

2,046,668

UNITED STATES PATENT OFFICE 2,046,668

LIQUID INDICATOR

William J. Wixson, Tulsa, Okla.

Application March 30, 1935, Serial No. 13,816

2 Claims. (Cl. 116—117)

This invention relates to liquid indicators adapted to indicate the contents of a vessel used for liquids of different specific gravities.

One of the objects of the invention is to produce a simple and inexpensive indicating device comprising a float chamber having a window through which indicating elements are clearly exposed to indicate the contents of the chamber. A further object is to produce a device of this kind in the form of an attachment that can be readily applied to a vessel used for the different liquids.

More specifically stated, an object is to provide a liquid indicator adapted to be applied to the discharge device of a tank truck used for gasoline and heavier liquids, so as to clearly show whether the liquid to be discharged is gasoline or one of the heavier liquids.

With the foregoing and other objects in view, the invention comprises the novel construction, combination and arrangement of parts hereinafter more specifically described and shown in the accompanying drawing, which illustrates one form of the invention. However, it is to be understood that the invention comprehends changes, variations and modifications which come within the scope of the claims hereunto appended.

To illustrate one form of the invention, I have shown a float chamber having a window, and a float provided with different indicating elements to be exposed at said window for the purpose of showing whether the liquid is gasoline, or a heavier liquid such as kerosene, the object being to avoid the mistake of delivering gasoline in response to an order for kerosene, which in actual practice has resulted in fires and explosions due to the use of gasoline which was regarded as kerosene. The indicating device can be conveniently exposed near the discharge valve of the vessel containing the liquid, so as to clearly advise the operator of the nature of the liquid when he is about to operate the discharge valve.

In the preferred form of the invention, the float is heavy enough to sink to the bottom of relatively light liquids, but buoyant enough to rise to the top of heavier liquids, and this float is submerged in a chamber having abutments which limit its vertical movements. The float may occupy two predetermined indicating positions wherein it is stopped by said abutments. When the float is stopped in one position, the designation for heavy liquid is exposed at the window of the float chamber, and when the float is stopped in the other position the designation for light liquid is exposed.

The light liquid may be gasoline or other explosive, highly inflammable fluid; and the heavy liquid may be kerosene or other fluid that does not require the unusual precautions involved in handling the light liquid. However, it is to be understood that the invention may be employed to indicate various liquids having different specific gravities, and that it is not limited to the indication of gasoline and kerosene.

Fig. 1 is a top view showing a portion of a container provided with a discharge device equipped with an indicator embodying the features of this invention.

Fig. 2 is a section on the line 2—2 in Fig. 1, drawn to a larger scale, showing the indicating device.

Fig. 3 is a section taken approximately on the line 3—3 in Fig. 1, a portion of the float chamber being in elevation to show the window through which the indicating elements are exposed.

4 designates a tank adapted to contain gasoline or kerosene, or other liquids having different specific gravities. The discharge pipe 5, leading from the bottom of this tank, is provided with a discharge valve 6, and a T-fitting 7 interposed between said valve and tank to receive the indicating device.

This indicating device comprises a vertically disposed cylindrical float chamber 8 having a threaded tubular extension 9 at one side, screwed into the T-fitting 7, to establish communication between the float chamber and the discharge pipe 5. The float 10 is exposed through a glass window 11 at the front of the float chamber, said window being near the middle of the float chamber, so as to expose the upper portion of the float when the latter rests upon the bottom of said chamber, as suggested in Fig. 3. This location of the window also provides for exposure of the lower portion of the float when said float engages the top wall of the float chamber. The top and bottom walls of the float chamber provide abutments which limit the vertical movements of the float, and thereby determine the positions of the indicating elements with relation to the window 11.

When the device is in service, the float is submerged in the liquid, and it has only two positions, either in contact with the top wall or the bottom wall of the float chamber, depending upon the specific gravity of the liquid in the float chamber.

The upper portion of the float may be colored to indicate gasoline, or other light liquid, and the lower portion may be colored to indicate kerosene, or other relatively heavy liquid. When one indicating element is exposed at the window 11, the other indicating element is concealed by portions of the float chamber above or below the window.

To prevent trapping of air in the upper portion of the float chamber and also to insure complete drainage of said chamber, a vertical port 13 is formed in the side of this chamber which adjoins the threaded extension 9, and this port 13 extends from the top to the bottom of the float chamber, so as to permit free escape of air from said chamber as the liquid enters therein. Therefore, when liquid is introduced into an empty tank, it will completely fill the float chamber, and this condition also provides for complete drainage of the float chamber when all of the liquid is discharged from the system.

It will now be understood that the simple indicating device can be very readily applied to the discharge conductor of a vessel used for liquids having different specific gravities, and that it can be employed as a safety device to very clearly indicate the presence of an inflammable, or explosive, fluid.

I claim:

1. In an indicating attachment for liquid containers, a float chamber having a threaded portion to secure it to the container, a window at one side of said float chamber, a float arranged within said float chamber and provided with an upper designation for relatively light liquids and a lower designation for heavier liquids, said float chamber being provided with upper and lower abutments to limit the vertical motion of the float, and said float being confined between said abutments, said window being in a horizontal plane between said abutments, said upper designation being exposed at said window when the float engages said lower abutment, and the lower designation being exposed at the window when the float engages said upper abutment.

2. In an indicating attachment for liquid containers, a float chamber having a vertically elongated port for the admission and discharge of air and liquid at the upper and lower portion of the float chamber, said float chamber also having a threaded portion to secure it to the container, a window at one side of said float chamber, a float arranged within said float chamber and provided with an upper designation for relatively light liquids and a lower designation for heavier liquids, said float chamber being provided with upper and lower abutments to limit the vertical motion of the float, and said float being confined between said abutments, said window being in a horizontal plane between said abutments, said upper designation being exposed at said window when the float engages said lower abutment, and the lower designation being exposed at the window when the float engages said upper abutment.

WILLIAM J. WIXSON.